United States Patent [19]
Cutchen et al.

[11] 3,737,211
[45] June 5, 1973

[54] FERROELECTRIC-TYPE OPTICAL FILTER

[75] Inventors: John T. Cutchen; Gene H. Haertling; James O. Harris, Jr.; Carroll B. McCampbell, all of Albuquerque, N. Mex.

[73] Assignee: The United States of America as represented by the United States Atomic Energy Commission, Washington, D.C.

[22] Filed: Dec. 1, 1971

[21] Appl. No.: 203,727

[52] U.S. Cl. .............................. 350/160 R, 350/150
[51] Int. Cl. .............................. G02f 1/28, G02f 1/36
[58] Field of Search .............................. 350/160, 150; 250/217

[56] References Cited

UNITED STATES PATENTS

| | | | |
|---|---|---|---|
| 3,531,182 | 9/1970 | Land et al. | 350/150 |
| 3,564,261 | 2/1971 | Haderman | 250/217 |
| 3,569,715 | 3/1971 | Horning | 350/150 |
| 3,609,002 | 9/1971 | Fraser et al. | 350/150 |
| 3,395,367 | 7/1968 | Bell et al. | 331/94.5 S |

*Primary Examiner*—Ronald L. Wibert
*Attorney*—Roland A. Anderson

[57] ABSTRACT

A variable density optical filter or window which includes an electrically variable, optically birefringent ferroelectric-type ceramic plate and means for controlling the birefringence of the plate in response to variations in ambient light to vary the optical transmittance of the ceramic plate with a rapid response time and potentially high contrast ratio.

4 Claims, 8 Drawing Figures

INVENTORS
JOHN T. CUTCHEN
GENE H. HAERTLING
JAMES O. HARRIS JR.
CARROLL B. McCAMPBELL JR.

BY
ATTORNEY

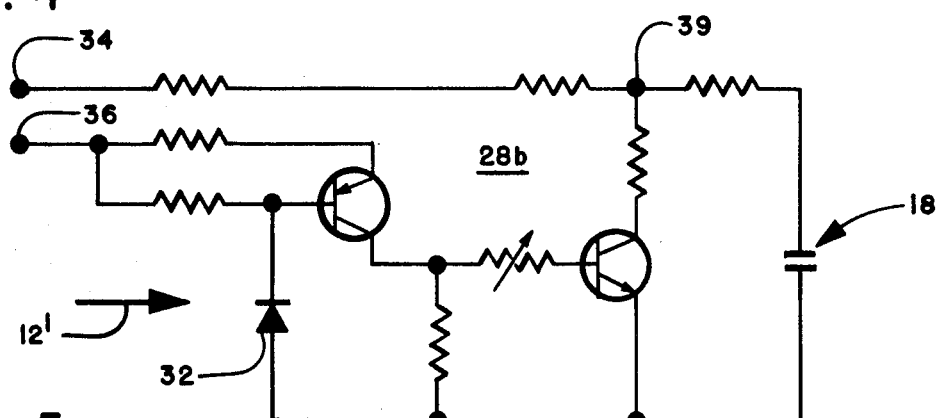
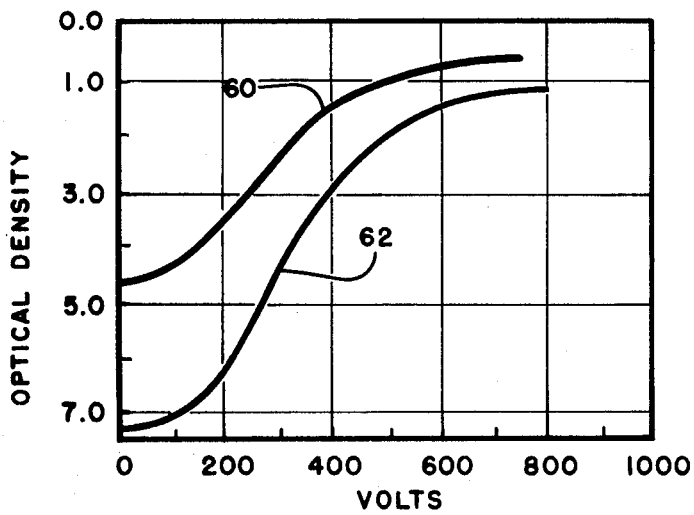
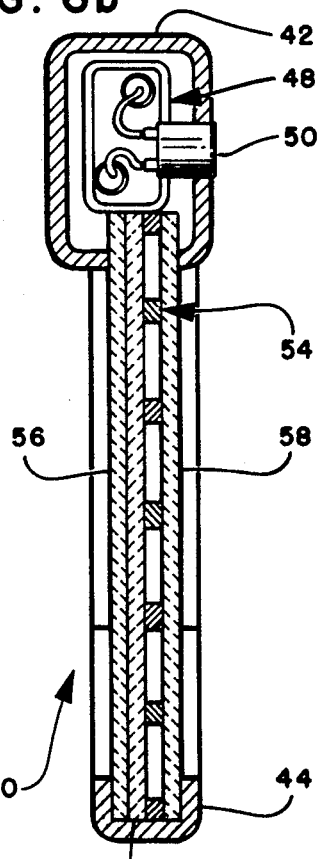
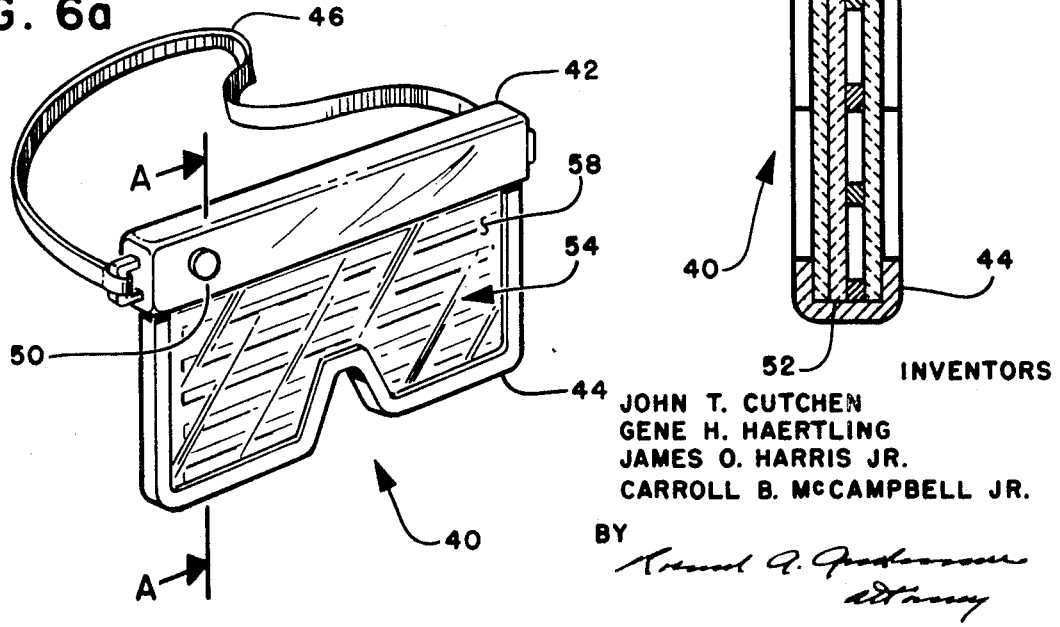
INVENTORS
JOHN T. CUTCHEN
GENE H. HAERTLING
JAMES O. HARRIS JR.
CARROLL B. McCAMPBELL JR.
BY

FERROELECTRIC-TYPE OPTICAL FILTER

BACKGROUND OF INVENTION

There are applications where it is desirable to control the amplitude of light impinging against some mechanism or area during changing ambient conditions or from sudden or unexpected light flashes. In some of these applications it may be desirable that the amplitude of light impinging on the mechanism or area be maintained at a constant level regardless of the amplitude of ambient light or that the impinging light amplitude be controlled to varying levels under either constant or varying ambient light conditions. In addition, there are other applications where the mechanism upon which the light is impinging, such as the human eye, may be subject to permanent or temporary damage or lowering of light sensitivity from exposure to excessive light radiation in either the visible or near visible spectrum. In these latter applications, there are instances where such damaging light intensities may occur in relatively rapid or short time periods so that any controlling means, for example a shutter or light filter, would have to respond in a time period corresponding to the light amplitude excursion to minimize damaging effects. Such rapid excursions may occur in some industrial applications or in nuclear explosions which produce intense light flashes. The optical shutter or filter in these applications must not only respond in a rapid time period but must also provide significantly high level contrast ratios to block a substantial portion of the light flash impinging on the filter or shutter.

SUMMARY OF INVENTION

In view of the above, it is an object of this invention to provide an optical filter or shutter which may control the amplitude of transmitted light in response to changes in ambient light conditions.

It is a further object of this invention to provide such an optical filter or shutter which may provide control of transmitted light in a very rapid response time.

It is a still further object of this invention to provide an electrically controllable, optical filter or shutter which is responsive to ambient light radiation conditions and which may provide relatively high contrast ratios.

It is a further object of this invention to provide an optical filter or shutter which may operate at low voltage and/or low power levels to provide portability.

Various other objects and advantages will appear from the following description of the invention, and the most novel features will be particularly pointed out hereinafter in connection with the appended claims. It will be understood that various changes in the details, materials and arrangement of the parts, which are herein described and illustrated in order to explain the nature of the invention may be made by those skilled in the art.

The invention comprises a birefringent ferroelectric-type ceramic plate, means responsive to ambient light for varying the birefringence of said ferroelectric-type ceramic plate to levels corresponding with changes in the ambient light, and polarizer and analyzer means for optically indicating said birefringent changes.

DESCRIPTION OF DRAWING

The present invention is illustrated in the accompanying drawings wherein;

FIG. 4 is a schematic diagram of another control circuit which may be used in the arrangement of FIG. 1 to provide a variable level control of transmitted light;

FIG. 5 is a graph of optical density vs switching voltage for typical single and double stage optical filters in the arrangement of FIG. 1;

FIG. 6a is a perspective and somewhat simplified view of pair of goggles constructed in accordance with this invention to provide light transmission control therethrough; and FIG. 6b is a cross sectional view along line AA of FIG. 5a.

DETAILED DESCRIPTION

Figure 1:
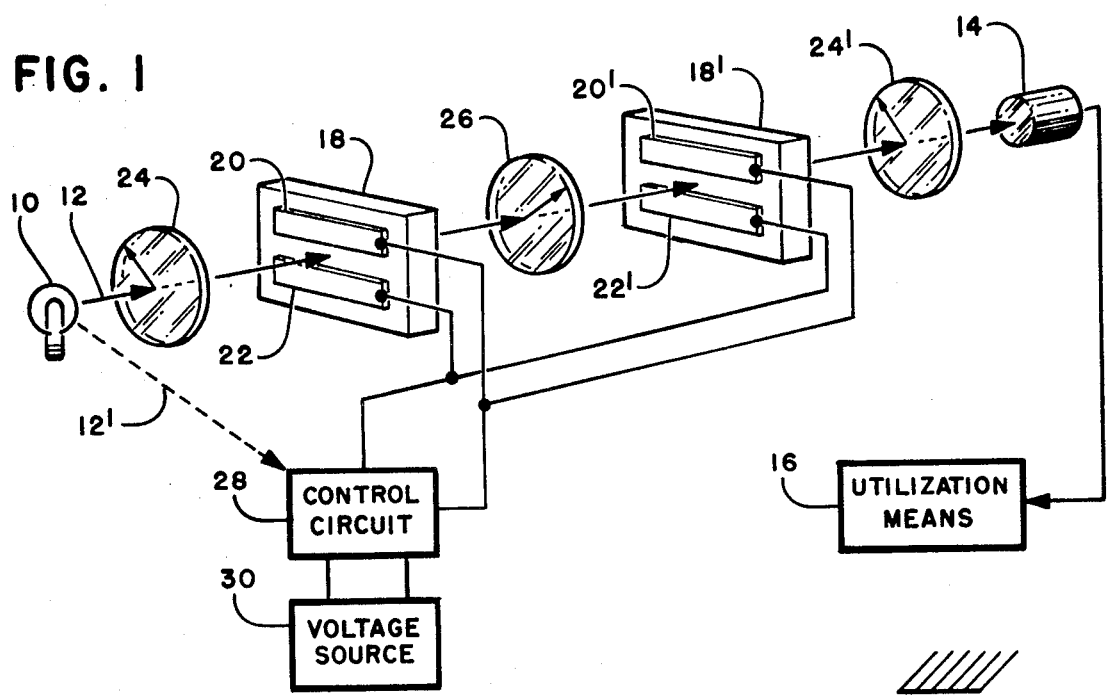
FIG. 1 is a diagrammatic and perspective view of the electrical and optical elements of the subject invention.

With the present invention, the light amplitude from any light source or ambient light, shown diagrammatically by the light source 10 and light beam 12, may be controlled to prescribed levels or even substantially blocked before it reaches a light sensitive mechanism 14 and utilization means 16, or some other appropriate apparatus or area including the human eye. The light amplitude control may be achieved by an appropriate ferroelectric-type ceramic plate 18 having a suitable electrode pair 20 and 22 disposed thereon so as to form a light aperture therebetween and appropriate polarizer 24 and analyzer 26 sandwiched on opposite sides of plate 18 in optical alignment with the light aperture.

The polarizer 24 and analyzer 26 are conventional polarizing elements having their polarizing axes disposed at 90° with respect to each other and at 45° to the polarizing direction in the plate 18. The ferroelectric-type ceramic plate 18, polarizer 24 and analyzer 26 are positioned generally parallel with each other and in optical alignment between light source 10 and light sensitive mechanism 14. A control circuit 28, having an element therein subjected to light radiation from light source 10, as shown by light beam 12', and responsive to the light amplitude thereof, is coupled by appropriate electrical circuitry or conductors to electrodes 20 and 22 through a suitable voltage source 30. Control circuit 28 and voltage source 30 provide an electrical control of the birefringence level of the ferroelectric ceramic material of plate 18 which is disposed between electrodes 20 and 22, as described below.

Ferroelectric-type ceramic plate 18 may be any ferroelectric or mixed paraelectric-ferroelectric phase material ceramic plate (hereinafter referred to as ferroelectric ceramic plates) prepared under appropriate conditions so as to be optically transparent and to exhibit electrically controllable birefringence and retardation effects. The ferroelectric ceramic is prepared in a generally thin, plate-like shape having generally parallel, optical quality surfaces of substantially greater dimension than the cross section or thickness between the surfaces. The ferro-electric ceramic may be a solid solution of lead zirconate-lead titanate with various modifying materials, including solid solutions of oxides of lead, lanthanum, zirconium and titanium, so long as the ceramic exhibits the desired optical and electrooptic effects. Typical usable materials are described in the copending application S.N. 885,789 of Gene H. Haertling entitled "Ferroelectric Ceramic Materials" and filed Dec. 17, 1969 and U.S. Pat. No. 3,531,182. These materials are generally macroscopically optically isotropic in the thermally depoled or virgin state but may be electrically induced or switched or be strain biased to a macroscopic anisotropic condition at which the material becomes macroscopically birefringent. Some materials may be electrically polarized by application of a suitable electric field to levels of polarization, such as zero and saturation remanent polarization levels and intermediate polarization levels therebetween, and levels of optical birefringence until subjected to an appropriate electrical field which switches the material to another level of polarization. Still other materials may be electrically polarized with an electric field from the thermally depoled or zero polarization state to an electrically induced ferroelectric state and be maintained at that latter state so long as the electric field is maintained. Upon removal of the electric field, the material will return to the depoled and essentially optical isotropic state.

Since the amplitude of the electric field needed to switch or change the polarization level of these ferroelectric ceramic materials is dependent on the distance between polarizing electrodes as well as on the material solid solution composition, the separation distance between electrodes 20 and 22 may be limited by voltage limitations of voltage source 30 or may require high voltage arc suppressing coatings or circuit arrangements. Large aperture sizes may be controlled by using a plurality of narrow, parallel electrodes arranged in a suitable array as shown by comb-type electrodes 20a and 22a in FIG. 2a on ferroelectric ceramic plate 18a. As shown, plate 18a may be generally round or oval in shape with the electrodes 20a and 22a conformed to the shape thereof with electrode segments of appropriate size and width to carry the necessary electrical signals. The alternating electrodes in the array are coupled to opposite polarities of the electrical control signal so as to construct a large aperture from the plurality of small apertures between each resulting electrode pair. If the electrodes are made of sufficiently small width, such as about two mils or less, the electrodes may effectively not be detected or be detectable by a sensing mechanism 14. The electrodes may be positioned in an array with any appropriate size and spacing such as with about 100 electrodes per inch to maintain low switching voltages of about 150 volts.

The initial angular position of polarizer 24 to analyzer 26 may be selected so as to provide either an open or extinction condition optically with respect to the initial condition of the ferroelectric ceramic plate, which may be at a depoled or an electric field enforced polarization level or at a saturation remanent level or any other remanent level condition, as desired. When the polarization of the ferroelectric ceramic is changed from the initial condition to some other condition, the birefringence of the ferroelectric ceramic plate may vary correspondingly so as to affect the amplitude of light transmitted through polarizer 24, ferroelectric ceramic plate 18 and analyzer 26 combination. Such electrode arrangements provide a "transverse mode" of operation due to the polarization vectors of the ferroelectric ceramic plate being parallel to the major surfaces of the plate and 90° with respect to the direction of viewing.

Figure 2A:
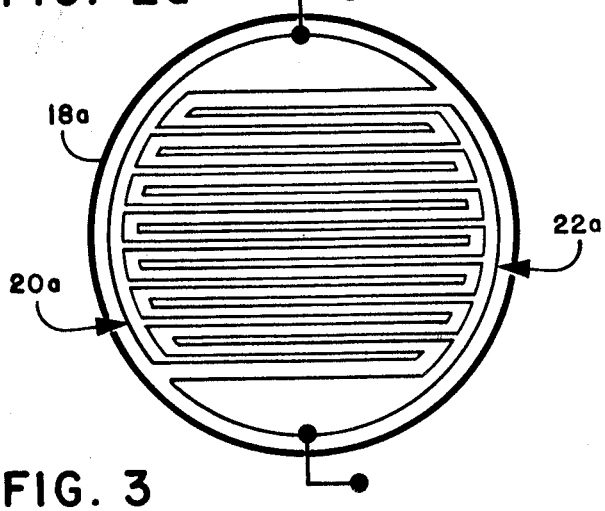
FIGS. 2a and 2b illustrate alternate electrode arrangements which may be used with the subject invention to provide the desired optical control with front and side elevation views respectively.
Figure 2B:
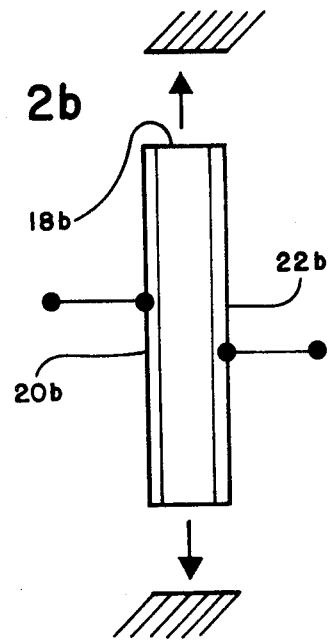

A wide aperture, ferroelectric ceramic plate, optical filter may also be provided, as shown in FIG. 2b, by depositing or otherwise disposing optically transparent, electrically conductive electrodes, such as electrodes 20b and 22b, over a portion or the entire major surfaces of a rhombohedral or tetragonal ferroelectric solid solution ceramic plate 18b. When the ferroelectric ceramic plate 18b is subjected to a tensile or compressive stress in a direction parallel to the major surfaces of the plate, such as shown by the tensile stress arrows, the material may be physically strain biased and become anisotropic and birefringent in the plane of the plate. This strain biasing may be achieved by various mechanisms and the ferroelectric ceramic plate bonded along opposing ends or in other manners to a suitable active or inactive structure, shown schematically. With this strain biased operation, switching from one level of birefringence to another may be achieved using a ceramic plate 18b 2 mils thick with a voltage of about 70 volts. These various strain-biasing operations are shown in the copending application of Cecil E. Land and Willis D. Smith S.N. 203,726 (S-40,673) for "Self Strain Biased Ferroelectric Electrooptics", and Gene H. Haertling, Cecil E. Land and Ira D. McKinney S.N. 203,723 (S-40,252) for "Strain Biased Ferroelectric Electrooptics", both filed on the same date as this application.

Figure 3:
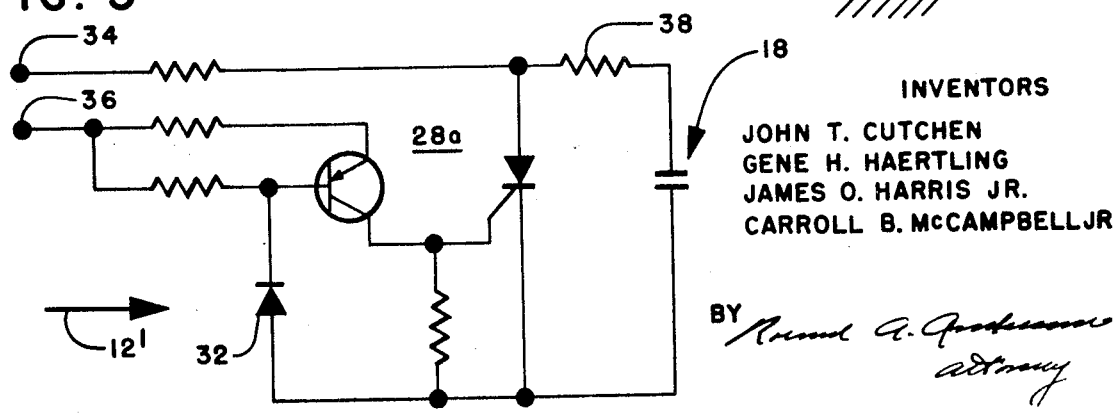
FIG. 3 illustrates a typical control circuit which may be used in the arrangement of FIG. 1 to provide an on-off operating capability.

Control circuit 28 may couple the necessary voltage levels from voltage source 30 to the respective electrodes to achieve the desired polarization changes within the ferroelectric ceramic plates 18, 18a and 18b in response to ambient light conditions, as represented by light beam 12', in an appropriate manner depending on the particular application of the optical filter, the type of ferroelectric ceramic solid solution composition and the electrode arrangement used. For example, control circuit 28 may take the form shown in either FIG. 3 or FIG. 4, when used with a ferroelectric ceramic plate 18, of mixed ferroelectric and paraelectric phase material exhibiting quadratic electrooptic effects. In FIG. 3, the control circuit 28a provides an on-off operation in which the photodiode 32, or other light sensitive element, provides a proper signal or change in circuit parameter corresponding to the light amplitude of light beam 12' which, with the other circuit parameters of circuit 28a, triggers the switching element (silicon controlled rectifier), which in turn reduces the voltage (from voltage source 30 at terminal 34) between the electrodes on ceramic plate 18 to near zero. Resistor 38 acts to control the decay time of the transmitted light intensity. An appropriate bias control voltage is applied at terminal 36. In the control circuit 28b of FIG. 4, the signal produced by photodiode 32 resulting from the amplitude of light beam 12' controls the amplitude of the voltage bias supplied from terminal 34 to junction 39. The voltage bias amplitude is dependent on the amplitude of the photodiode signal as well as the amplitude of the voltage supplied by voltage source 30 and the parameters of circuit 28b. Thus, circuit 28a of FIG. 3 may produce a "switching" voltage which is of sufficient amplitude to electric-field induce a change in birefringence in the ferroelectric ceramic plate from the initial level to some different level, while the circuit 28b of FIG. 4 provides a varying electric voltage to the electrodes of the ferroelectric ceramic plate to change the birefringence of the ferroelectric ceramic from an initial level to different levels, depending upon amplitude of the voltage.

Any of the above-described arrangements may produce on-off contrast ratios of up to about 7500 to 1 or provide various amplitudes of light transmission at a plurality of levels between the open condition and the extinction condition, such as shown by curve 60 in FIG. 5 using an electrode arrangement similar to FIG. 2a with 2 mil electrodes spaced 40 mils apart on a 5 mil thick PLZT 9/65/35 ceramic plate.

If increased extinction or if off-axis light control is desirable, an additional ferroelectric ceramic plate 18', together with an appropriate electrode pair 20' and 22', may be provided in optical alignment with polarizer 24, ferroelectric ceramic plate 18 and analyzer 26, as shown in FIG. 1, and the electrodes 20' and 22' connected in parallel to control circuit 28, voltage source 30, and electrodes 20 and 22. A third polarizer 24' may then be provided in optical alignment with the other elements of the optical filter with its polarizing axis aligned with that of polarizer 24. With the additional ferroelectric ceramic plate 18' coupled to the optical filter and the electrode arrangement of FIG. 2a described above, contrast ratios of up to 1,000,000 to 1 may be achieved, such as shown by curve 62 of FIG. 5, and at the same time essentially block off-axis light from the light sensitive mechanism 14.

Additional ferroelectric ceramic plates and corresponding polarizers may be aligned with the previously described ferroelectric ceramic plates and polarizers to achieve further off-axis light control and enhanced contrast ratios, however with overall decrease in level of optical transmittance capabilities resulting from increased absorption and reflection losses.

The device of FIG. 1, using one or more ferroelectric ceramic plates and corresponding polarizers may be used as optical filters, lenses, windows and the like for any desired configuration or size. The optical filter may also be arranged as a goggle for personnel use for eye protection from potentially damaging light flashes or other light radiation or it may be used as sunglasses and in similar applications. Because of the relative low voltage and lower power requirements of the ferroelectric ceramic plate afforded by appropriate selection of ferroelectric ceramic material and electrode configuration, the control circuit and voltage source may be incorporated and carried with the optical filter with the photosensitive element positioned adjacent thereto. Automatic control of light transmitted through the ferroelectric plate may thus be achieved for ambient light directed at the eyes of personnel wearing the optical filter goggle.

FIG. 6a and 6b illustrate such a goggle. The ferroelectric ceramic optical filter 40 may be supported by an appropriate shell or housing 42 which in turn may be supported by a headband 46 for disposition of the optical filter 40 in front of the eyes of a user of the device. Housing 42 is adapted to support and hold a control circuit and operating and/or control bias voltage source 48 as well as the corresponding photosensitive element 50 coupled thereto in a manner to expose the photosensitive portion of element 50 to ambient light directed against the outer surface of the goggles. A ferroelectric ceramic plate 52 having an appropriate electrode pair 54 disposed on a surface thereof is positioned within supporting bracket 44 and housing 42 with the electrode array coupled to control circuit and voltage source 48 in the same manner as shown in FIG. 1 above. The electrode array 54 is shown in phantom view in FIG. 6a and is similar to the electrode array of FIG. 2a. The appropriately disposed polarizer 56 and 58 are then positioned on either side of ferroelectric ceramic plate 52. Ferroelectric ceramic plate 52, in a manner described above, is understood to be in some desired initial birefringence condition. The goggles of FIGS. 6a and 6b may then be operated in the same manner as described above with either of the circuits 28a or 28b of FIGS. 3 and 4, typically using voltages at terminal 34 of about 50 to 1500 volts at from about 10 to 0.1 milliamperes or less. Contrast ratios as above may be achieved in about 200 microseconds from high intensity light flashes.

What is claimed is:

1. A variable density optical filter comprising a ferroelectric-type ceramic plate having generally parallel optical quality surfaces of substantially greater dimension than the cross section between said surfaces, said ferroelectric-type ceramic plate being an essentially optically isotropic lead zirconate-lead titanate solid solution exhibiting electrically inducible ferroelectric and variable birefringence electrooptic effects, and a pair of spaced apart electrodes disposed on a surface of said plate; means coupled to said electrodes and including a photosensitive element controlled power source responsive to the amplitude of light radiation to which a surface of said plate is subjected for electrically inducing a ferroelectric state in said plate a birefringence in a direction in said plate to electrically controllable levels proportional to increase and decreases in amplitude of said light radiation within about 200 microseconds of said light amplitude changes; first polarizing means adjacent one of said surfaces for polarizing said light impinging on said plate; and second polarizing means adjacent the other surface of said plate positioned with polarizing axis at 90° with respect to said first polarizing means and coacting therewith for varying the level of light passing through the combination of said ferroelectric-type ceramic plate and said first and second polarizing means by controllable optical density changes through said combination of up to about 4 from an optical density of less than about 1 with said electrically induced changes in the birefringence of said plate, the direction of the polarizing axes of said polarizing means being other than said birefringence direction.

2. The filter of claim 1 together with means for portably supporting said entire filter on a person's head.

3. The filter of claim 1 wherein said light radiation means includes means for electrically varying said birefringence to a plurality of levels proportional and responsive to levels of said light radiation.

4. The filter of claim 1 including a second ferroelectric-type ceramic plate optically aligned with said other ferroelectric-type ceramic plate adjacent said second polarizing means having generally parallel optical quality surfaces parallel to the surfaces of said other ferroelectric-type ceramic plate and of substantially greater dimension than the cross section between said surfaces, said second ferroelectric-type ceramic plate being an essentially optically isotropic lead zirconate-lead titanate solid solution exhibiting electrically inducible ferroelectric and variable birefringence electrooptic effects; a pair of spaced apart electrodes disposed on a surface of said second plate; means for coupling said light radiation responsive means in electrical parallel with said electrode pair of said second ferroelectric-type ceramic plate for electrically inducing a ferroelectric state in said second plate and birefringence in about the same direction in said second plate as said other plate to electrically controllable levels proportional to said increases and decreases in amplitude of said light radiation and corresponding with the birefringence level of said other ferroelectric-type ceramic plate within about 200 microseconds of said light amplitude changes; and a third polarizing means positioned adjacent a surface of said second ferroelectric-type ceramic plate sandwiching the same between said second polarizing means and said third polarizing means, said third polarizing means with polarizing axis parallel with said first polarizing means for coacting with said first and second polarizing means and said other ferroelectric-type ceramic plate and said second ferroelectric-type ceramic plate for varying the level of light passing through the combination of all of said polarizing means and said ferroelectric-type ceramic plates by controllable optical density changes of up to about 6 from an optical density of about 1 with said electrically induced changes in birefringence of said plates.

* * * * *